No. 689,414. Patented Dec. 24, 1901.
M. ROBINSON.
SWITCH AND OUTLET BOX.
(Application filed Oct. 28, 1901.)
(No Model.) 2 Sheets—Sheet 1.

WITNESSES:
G. Gunther.
O. C. Wiberg.

INVENTOR:
Miner Robinson

No. 689,414. Patented Dec. 24, 1901.
M. ROBINSON.
SWITCH AND OUTLET BOX.
(Application filed Oct. 28, 1901.)

(No Model.) 2 Sheets—Sheet 2.

WITNESSES:
G. Gunther
O. C. Wiberg.

INVENTOR:
Miner Robinson

UNITED STATES PATENT OFFICE.

MINER ROBINSON, OF NEWTON, MASSACHUSETTS.

SWITCH AND OUTLET BOX.

SPECIFICATION forming part of Letters Patent No. 689,414, dated December 24, 1901.

Application filed October 28, 1901. Serial No. 80,295. (No model.)

*To all whom it may concern:*

Be it known that I, MINER ROBINSON, of Newton, in the county of Middlesex and State of Massachusetts, have invented certain new and useful Improvements in Switch, Outlet, and Receptacle Boxes, of which the following is a specification.

Figure 1:
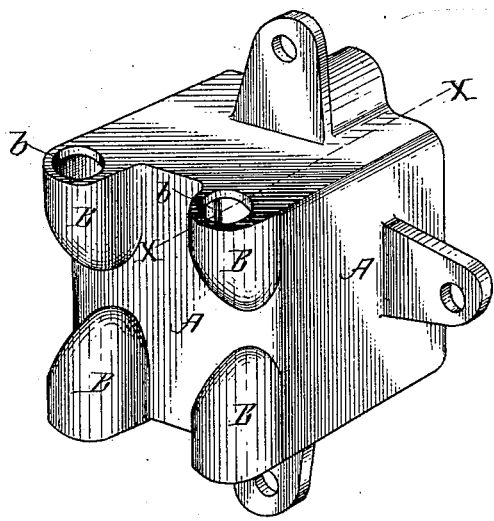
Figure 2:
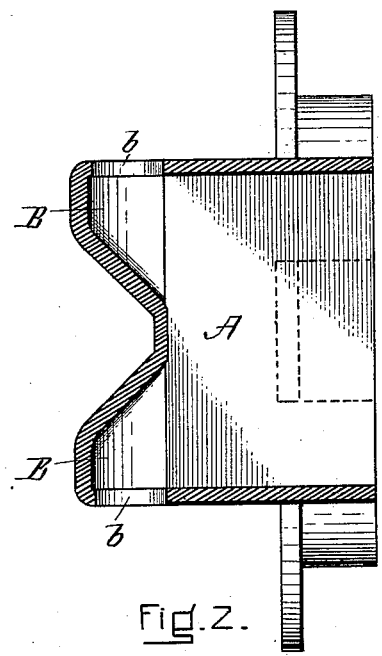
Figure 3:
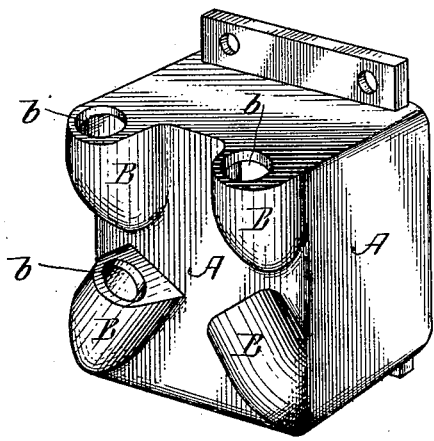
Figure 4:
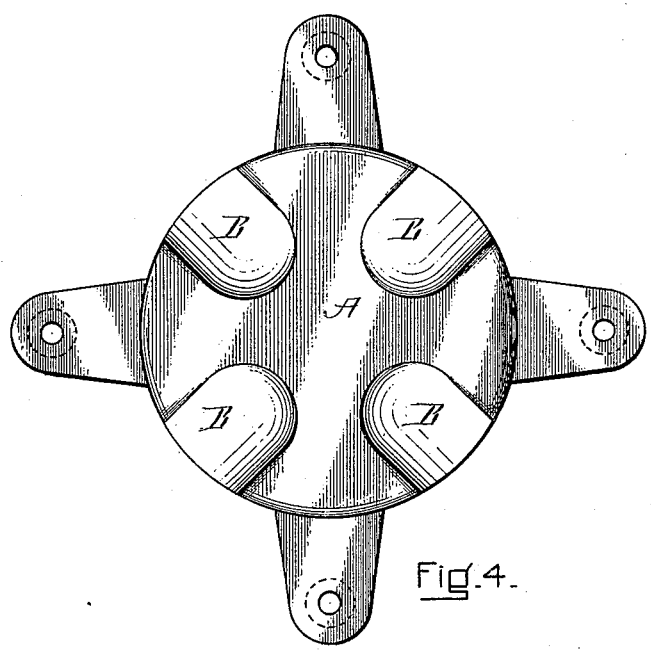
Figure 5:
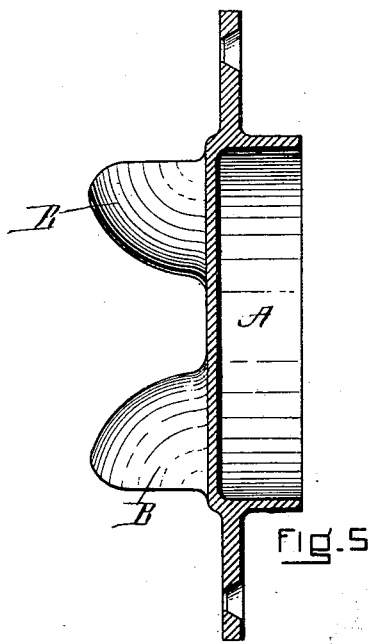

The object of my invention, as shown by the accompanying drawings, is to provide certain improvements in switch, outlet, and receptacle boxes, especially where used in connection with flexible conduits, although by slight modification they may be adapted to rigid iron or other conduits.
At present it is customary to have holes either in the back or side of the body of the box for conduits to enter or thin partitions or plugged holes are provided also in the main box, so arranged that when the partitions or plugs are removed holes are left either in the back or side of the box proper. I have found the above arrangement impracticable for various reasons. First, the flexible conduit is not securely held in place, and, second, the flexible conduit is liable to be either pulled through too far or get pushed back when installing the switch, thereby allowing the wire to come against the edges of the holes, and as the switch usually takes up practically all of the space inside of the box there is no room for the conduit to enter the box only for a very short distance. Where the holes enter directly into the back of the box it is necessary to have considerable depth in the partition in order to have the conduit enter easily, as it is not convenient to bend the said conduit on a very short radius. In order to overcome these and other defects, I have invented the form of construction hereinafter set forth.
Referring to the accompanying drawings, Figures 1 and 3 are perspective views of modified forms of my improved rectangular box. Fig. 2 is a vertical section on *x x*, Fig. 1. Figs. 4 and 5 show in rear view and cross-section, respectively, my box when made in circular form.

Preferably on the back of the box A, I provide pockets B for the flexible conduit to enter, these pockets being outside the body of the box proper, but communicating therewith, the hole *b* through the pocket being of such a size as to form a snug fit for the flexible conduit. These pockets in communicating with the body of the box are preferably bent or curved, or at any rate so arranged as to receive the conduit not at right angles to the side or bottom of the box on which the projection or pocket is made, but substantially parallel or slightly obliquely thereto should this be necessary to facilitate the drilling of the openings in any of the pockets. The openings in the pockets are arranged in the case of rectangular boxes to face either in opposite directions, as in Figs. 1 and 2, or in the same general direction, as in Fig. 3, or in the case of circular boxes radially, as in Figs. 4 and 5. These pockets securely hold the end of the flexible conduit from being pushed too far into the box, and as the flexible conduit is usually run to the nearest insulator, forming a slight bend as it enters the pocket, the side of the hole grips the conduit with sufficient force to prevent it from being easily withdrawn. The pockets might be arranged on either the side or the back of the box, though for convenience of installation I place them on the back, as shown in the drawings.

Where the box is to be used for "new work"—that is, before the buildings are lathed and plastered—the backs are arranged as shown in Figs. 1, 2, 4, and 5—that is, two pockets facing one way and two the other, as in Figs. 1 and 2, or radially, as in Figs. 4 and 5.

In order to provide a box for use in "old work"—that is, to be cut into a finished wall or partition—a box provided with pockets, as shown in Fig. 1, could not be conveniently used. This is apparent for the reason that the hole cut in the wall being of limited size would be too small to allow a box with pockets arranged as in Fig. 1 or Fig. 4 to be put in place after the flexible conduits had been inserted in more than two pockets. In order to overcome this difficulty, I have provided a modified form of box in which all of the pockets B have their openings *b* in the same direction or the same general direction as shown in Fig. 3.

My object in slightly inclining two of the pockets, as shown in Fig. 3, is for convenience in drilling the holes *b b* in the two lower pockets, the inclination being of such an angle as to allow the shank of the drill to pass between the two upper pockets. This box can be readily inserted in a hole in the wall but little larger than itself, even though conduits have been entered in all the pockets before it is pushed in place.

I consider the above invention a decided improvement in switch, outlet, and receptacle boxes for many reasons, among which are the following: There is much saving of labor in installing both box and switch, as it is not necessary to rearrange or trim the flexible conduit at the time of installing the switch; the permitting of its use in extremely narrow partitions; much shorter pieces of conduit may be used from the nearest insulator to the switch-box, as each pocket securely holds the end of the conduit, no matter how short; also, a saving of material, both in flexible conduit and wire, as both conduit and wire may be cut at the time of installing at exactly the right length, as there is no danger of their being pushed back or pulled out; also, the great facility afforded for plugging up the openings in any unused pockets, as in the case of a single-pole switch using but two pockets, as the pocket may be readily filled with any sealing material.

I am aware that boxes have been constructed and are in use wherein metal projections or thimbles are made attached directly to the side or bottom of the main body of the box and are arranged to receive conduits at right angles to the side or bottom of the box and with their conduit-openings made straight, directly communicating with the main body of the box, and such I do not claim.

It is my intention to adapt this invention to rigid iron conduit as well as flexible conduit and also to the several different styles and sizes of boxes known as "gangs," where two or more switches, receptacles, &c., are grouped under one plate.

While the form of construction as shown in the drawings admits only one conduit into each pocket, the pockets could be constructed wide enough to have openings for the entering of two or more conduits in the same pocket.

Having now described my invention, what I claim is—

1. A switch, receptacle or outlet box provided with conduit-receiving pockets or projections protruding from the body of the box and communicating therewith, so arranged as to receive the conduit as it enters the pocket or projection substantially parallel to the side or bottom of the box on which the pocket or projection is made, substantially as and for the purposes described.

2. A switch, receptacle or outlet box provided with bent or curved conduit-receiving pockets or projections protruding from the body of the box and communicating therewith whereby the conduit enters the pocket or projection parallel with or obliquely to the side or bottom of the box upon which the pocket or projection is made, the openings in the box being of such size as to form a snug fit for entering the conduit substantially as and for the purposes described.

3. A switch, receptacle or outlet box A provided with two or more bent or curved conduit-receiving pockets B with their openings b facing in the same general direction substantially as and for the purposes described.

In testimony whereof I have affixed my signature in presence of two witnesses.

MINER ROBINSON.

Witnesses:
GERTRUDE GUNTHER,
OLGA C. WEBERG.